US012100526B2

(12) United States Patent
Pennington

(10) Patent No.: US 12,100,526 B2
(45) Date of Patent: Sep. 24, 2024

(54) APPARATUS AND METHODS FOR STORING HAZARDOUS MATERIALS BY ENCASING SAME IN A FUSIBLE METAL ALLOY

(71) Applicant: Charles W. Pennington, Alpharetta, GA (US)

(72) Inventor: Charles W. Pennington, Alpharetta, GA (US)

( * ) Notice: Subject to any disclaimer, the term of this patent is extended or adjusted under 35 U.S.C. 154(b) by 0 days.

(21) Appl. No.: 17/860,775

(22) Filed: Jul. 8, 2022

(65) Prior Publication Data

US 2024/0136080 A1 Apr. 25, 2024
US 2024/0233971 A9 Jul. 11, 2024

Related U.S. Application Data

(63) Continuation of application No. 16/484,251, filed on Aug. 7, 2019, now Pat. No. 11,430,579.

(51) Int. Cl.
*G21F 5/015* (2006.01)
*G21F 1/08* (2006.01)
(Continued)

(52) U.S. Cl.
CPC ................ *G21F 5/015* (2013.01); *G21F 1/08* (2013.01); *G21F 5/008* (2013.01); *G21F 5/14* (2013.01)

(58) Field of Classification Search
None
See application file for complete search history.

(56) References Cited

U.S. PATENT DOCUMENTS 3,117,558 A 1/1964 Evans
3,414,727 A 12/1968 Bonilla
(Continued)

FOREIGN PATENT DOCUMENTS

RU 2109355 C1 * 4/1998
RU 2113023 C1 6/1998
WO 9842793 A1 10/1998

OTHER PUBLICATIONS

Zrodnikov, Av, et al., "Innovative Nuclear Technology Based on Modular Multi-Purpose Lead-Bismuth Cooled Faster Reactors"; Progress in Nuclear Energy 50 (2008, pp. 170-178).
(Continued)

*Primary Examiner* — Andrew Smyth
(74) *Attorney, Agent, or Firm* — Thomas | Horstemeyer, LLP

(57) ABSTRACT

An apparatus is provided for storing hazardous waste material, which includes one or more of spent nuclear fuel, radioactive material, and fissionable material. The apparatus comprises a containment vessel that encloses the hazardous waste material. A fusible alloy material, for example, a eutectic material, resides within the containment vessel and surrounds the hazardous waste material. In the preferred embodiments, it is suggested that the fusible alloy material exhibits liquidus and solidus or melting temperatures that are between about 100 and 300 degrees Fahrenheit for facilities using the apparatus and methods for liquid storage pool loading applications. For facilities using the apparatus and methods for dry loading, the fusible alloy materials may exhibit liquidus and solidus or melting temperatures that are between about 100 and 650 degrees Fahrenheit. The fusible alloy material is introduced in a liquid phase and eventually solidifies into a solid phase as the temperature of the hazardous waste material and/or the local environment decreases.

20 Claims, 4 Drawing Sheets

(51) Int. Cl.
*G21F 5/008* (2006.01)
*G21F 5/14* (2006.01)

(56) References Cited

U.S. PATENT DOCUMENTS

| | | | | |
|---|---|---|---|---|
| 3,573,462 | A | 4/1971 | Wilkins | |
| 5,898,747 | A * | 4/1999 | Singh | G21F 5/012 376/272 |
| 5,995,573 | A | 11/1999 | Murray, Jr. | |
| 6,990,166 | B2 | 1/2006 | Matsunaga et al. | |
| 9,117,558 | B1 | 8/2015 | Pennington | |
| 2012/0201340 | A1* | 8/2012 | Pennington | G21C 19/20 376/261 |
| 2014/0155675 | A1 | 6/2014 | Murphy | |

OTHER PUBLICATIONS

International Search Report and Written Opinion in co-pending, related PCT Application PCT/US18/19644, mailed Apr. 30, 2018.

* cited by examiner

APPARATUS AND METHODS FOR STORING HAZARDOUS MATERIALS BY ENCASING SAME IN A FUSIBLE METAL ALLOY

CLAIM OF PRIORITY

This application is a continuation of and claims priority to U.S. application Ser. No. 16/484,251, filed Aug. 7, 2019 which is a § 371 national stage application of PCT Application No. PCT/US2018/019644, filed Feb. 26, 2018 which claims priority to and the benefit of Application No. 62/464,021, filed Feb. 27, 2017, which are incorporated herein by reference in their entireties.

FIELD OF THE INVENTION

The present invention generally relates to storage of hazardous waste materials, and more specifically, to apparatus and methods for storing hazardous waste materials, such as spent nuclear fuel, radioactive materials, and/or fissionable materials, by encasing the materials in a fusible metal alloy, for example, a eutectic material. Such alloys are herein termed fusible alloy and eutectic (FAE) materials.

BACKGROUND

Spent nuclear fuel has historically been stored in deep reservoirs of water, called spent fuel pools, within nuclear power plants of western design. This spent fuel storage technology is often termed "wet storage." Spent fuel pools at reactors are reaching their spent fuel capacity limits, causing concerns about the need to shut down reactors because there is no more room for the spent fuel. Dry nuclear spent fuel storage technology (termed "dry storage") is deployed throughout the world to expand the capabilities of nuclear power plants to discharge and store nuclear spent fuel external to a reactor's spent fuel pool, thereby extending the operating lives of the power plants.

Two fundamental classes of technology are used in dry spent fuel storage: metal casks that are directly loaded in spent fuel pools at the plants, with final closure lids that are bolted closed after loading with spent fuel, and concrete storage casks containing metal canisters having final closure lids that are welded closed or sealed with mechanical methods at the power plants following spent fuel loading. Once a canister has been loaded with spent fuel in the plant's spent fuel pool, a transfer cask system is used to move the canisters to a location where the canisters are downloaded into the concrete storage casks. This latter dry storage technology is referred to as canister-based, concrete spent fuel storage. The concrete cask serves as an enclosure or overpack structure that provides mechanical protection, heat removal features, and radiation shielding for the inner metal canister that encloses the radioactive material. The use of this technology tends to have a significant capital cost advantage over the use of metal cask technology for storage, but it is operationally more time-consuming and costly due to additional handling system capital and operation costs, and the use of a transfer cask system adds to the operators' radiation exposure, as well. This technology has been established and well-proven over more than 30 years, with about 3,000 spent fuel storage systems installed and in operation within the U.S. alone.

However, for transport of spent nuclear fuel, metal casks are still the preferred technology. For dry spent nuclear fuel transport, two fundamental classes of technology are used: (i) metal casks with final closure lids (or lid) that are bolted closed at power plants or other facilities after loading of the spent fuel into discrete, open receptacles or compartments (typical of such compartments are vertical tubes with square, circular, or other geometrically shaped openings) of a separate structure nested within the cask body (termed the "basket"); this technology when used for spent fuel shipment is termed "bare fuel" transport; and (ii) similar metal casks with bolted final closure lids (or lid) having the metal canister used in dry storage (e.g., with a concrete storage cask) within the cask body, the canister containing the basket structure and the final closure lid (or lids) installed at the power plants or other facility for storage following spent fuel loading; this technology when used for spent fuel shipment is called "canistered fuel" transport.

Clearly, if it were possible to design a cost-effective storage and transport system that could also be used for ultimate disposal, and to do so without the need for canisters, transfer systems, and added operational costs while also being safer, more secure, and less costly, that technology could become a dominant contributor to the solution of the world's spent fuel storage, transport, and disposal problems. That is the proposition that this disclosure demonstrates is possible, although the invention herein can also be used with canistered spent fuel for storage, transport and disposal, as well as for any radioactive, fissionable, or hazardous materials.

SUMMARY OF THE INVENTION

Apparatus and methods are provided for storing hazardous waste material, which includes one or more of spent nuclear fuel, radioactive material, and fissionable material.

One embodiment, among others, is an apparatus that comprises a containment vessel that encloses the hazardous waste material. An FAE material, for example, a eutectic material, resides within the storage locations in the containment vessel and surrounds the hazardous waste material. In the preferred embodiment, the FAE material is a stable, non-chemically-reactive material with the hazardous waste material it encases or the cask internals, so that it has no long-term, detrimental effects and, in some of these embodiments, exhibits liquidus and solidus or melting temperatures that are preferably between about 100 and 300 degrees Fahrenheit. The FAE material is introduced in a liquid phase and eventually solidifies into a solid phase as the temperature of the hazardous waste material decreases. The temperature range of 100 and 300 degrees Fahrenheit is only suggested herein because of the impact higher temperatures could have on the time required to heat the FAE material to liquidus/melting temperatures, on limiting the ability of using heated water to melt the FAE material, and on the effects of using such temperatures in the liquid storage pool or on the operations floor of power plants or other facilities that have similar temperature restraints as a result of using liquid storage pools of water for the hazardous waste materials. However, in certain facilities where dry FAE material loading could be accomplished, such as disposal or repository site interim storage facilities, or disposal or repository facilities prior to ultimate placement of the hazardous waste containment systems in said facilities, completing the hazardous-material movement life-cycle, such temperatures could be higher as a result of using FAE materials with higher liquidus/solidus or melting temperatures.

Another embodiment, among others, is a method for producing a containment vessel for storing hazardous waste material, which includes one or more of spent nuclear fuel, radioactive material, and fissionable material. The method comprises the steps of providing a containment vessel in a liquid storage pool of water, the containment vessel having a bottom part at a bottom and one or more elongated vertically oriented metallic receptacles extending upwardly from the bottom part, at least one of the receptacles having the hazardous waste material therein; introducing an FAE material in a liquid phase into at least one of the receptacles having the hazardous waste material in order to surround the hazardous waste material; and covering the containment vessel at a top with a lid in order to limit free-surface motion of the FAE material while the FAE material remains in the liquid phase.

Other embodiments, systems, methods, apparatus, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. All the drawings are for illustration only.

FIG. 1A is a top plan view of an ASTRID system cask containing a basket with cells containing hazardous waste material. FIG. 1B is a vertical elevation (perspective) view of the ASTRID system cask of FIG. 1A, sitting on its base and showing the top view into the cask internals. Further, FIGS. 1A and 1B illustrate a special feature of this invention where the filling of only some storage tubes in the outer row with fusible alloy material can reduce the package weight by several thousands of pounds. The same might be done for several storage locations scattered within the basket or even in the central region of the basket design. By placing hazardous material design contents in these non-FAE-material-filled storage locations that have the appropriate design heat generation rates and reduced levels of fissionable materials, the package design content capacity may be increased with no significant change to the peak criticality ($K_{eff}$) levels or to the other design requirements of the ASTRID system.

FIG. 2A is a side view of a canister that contains an array of containers with fissionable material. FIG. 2B is a side view of a cask that is designed to receive and contain the canister of FIG. 2A. FIG. 2C illustrates a first embodiment of the canister of FIG. 2A situated within the cask of FIG. 2B wherein FAE material is situated within the cask outside of the canister. FIG. 2D illustrates a second embodiment of the canister of FIG. 2A situated within the cask of FIG. 2B wherein FAE material is situated inside the canister.

FIG. 4 illustrates an embodiment where a tube is used separate from the basket receptacle tube of the cask or canister, with the separate tube containing the hazardous waste and FAE material, and designed for loading into a fixed basket receptacle tube storage location of the cask or canister system.

DETAILED DESCRIPTION OF THE INVENTION

Table of Contents

Figure 1B:
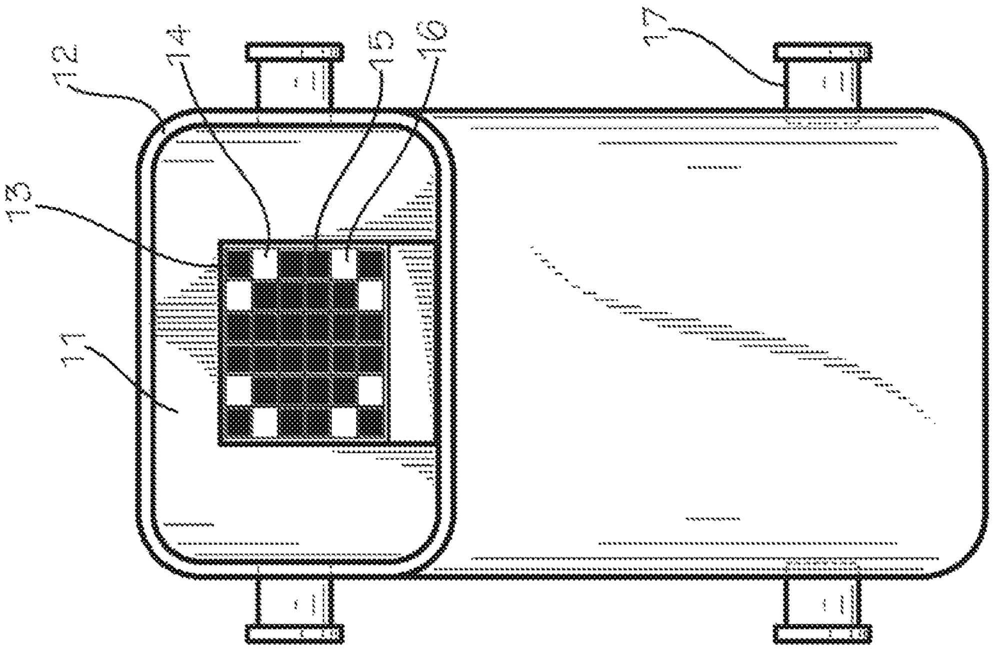
FIGS. 1A and 1B illustrate an embodiment of an at-site storage, transport, repository interim-storage, and disposal (ASTRID) system cask in accordance with the present invention. Specifically.

A. Regulatory Requirements and Design Considerations
B. Method Description
 1. Regulatory Compliance and Design Considerations
 2. Materials, Methods and General Operations
  a. Materials and Methods
 3. Material and Method Embodiment Categories Design of an Astrid System Using FAE Materials
  (1) Preferred Embodiments of New ASTRID System Designs Using FAE Materials
  (2) Preferred Embodiments of Modifications to Currently Licensed ASTRID Systems for Using FAE Materials
  (3) Preferred Embodiments of Water Removal Methods for ASTRID System Designs Using FAE Materials That May Trap, Retain, or Hold Water
  (4) New Package Design for Dry-Loaded Radioactive, Fissionable, or other Hazardous Material
 b. FAE Material Loading Methods for the ASTRID System
  (1) FAE Material Loading with Installation of Low-Melting Point FAE Materials in an ASTRID System Cask Prior to Delivery to Hazardous Waste Loading Site
  (2) Injection of FAE Material into the ASTRID System Cask While It Is at the Hazardous Waste Loading Site
  (3) Injection of FAE Material in the ASTRID System Cask While It Is Immersed and on the Liquid Storage Pool Floor
  (4) Injection of FAE Material in the ASTRID System Cask After Fuel Loading and Water Removal While the Cask Top Opening Is Above the Pool Surface
  (5) Dry Loading of FAE Material in a Dry ASTRID System Cask at an Interim Storage Facility, Storage Site,Disposal Site, or Repository
 c. System Hazardous Waste Loading Operations
  (1) Hazardous Waste Loading Operations with FAE Material Pre-installed Prior to Arriving at the Loading Site
  (2) Hazardous Waste Loading Operations When FAE Material is Loaded After Wet Loading of Hazardous Waste Material
 4. General Operations Discussion
C. Conclusions Spent nuclear fuel is one important form of both radioactive material and fissionable material hazardous waste, although there are a number of other materials and waste forms to which the methods disclosed herein would equally apply, such as material enriched in a fissionable radionuclide or various forms of other hazardous materials (as defined by federal or state statute). Spent fuel is used herein as a prime example to demonstrate the method because it is typically the most challenging of all radioactive and fissionable materials and of hazardous waste products for the life cycle of storage, transport, and disposal. The discussion and application of the methods herein to spent nuclear fuel offer just one of several embodiments, but that application is exemplary of the application of these systems and methods to the full range of hazardous waste materials.

A. REGULATORY REQUIREMENTS AND DESIGN CONSIDERATIONS

Dry spent fuel storage and transport system designs must typically comply with all federal regulatory requirements. As part of the implementation of these requirements, regulatory bodies have issued design limitations on the allowable temperature of the spent nuclear fuel during the loading, drying, and closure of the canisters or transport casks, during the storage of the systems at the power plants, and during the transport of the spent fuel away from the plant. These casks and canisters are typically backfilled with inert gasses, such as helium, that provide conductive and convective cooling modes for the spent fuel, slowly transferring the spent fuel decay heat to the outer metal shell of the transport cask or to the canister shell for the concrete storage cask.

Drying of the spent fuel and the inside of the containers that store or transport it is an important consideration in order to assure there is little, if any, retained moisture that could produce long term degradation of the fuel or of the system that contains it due to radiolysis of water. When dry storage canisters or metal casks are being prepared for closure and moisture is being removed to dry the spent fuel in preparation for storage or transport, the regulatory requirements stipulate both a maximum allowable fuel temperature and a maximum range of temperature variation that the spent fuel is allowed to experience. The storage and transport systems, in combination with the ancillary drying systems used to remove the moisture, must be designed to limit fuel temperatures and temperature variations while still fulfilling the drying function that is done with partial vacuums. These temperature limits help assure that the material properties of the spent fuel cladding are maintained in a safe and predictable range. Of all methods for drying closed spent fuel containers, vacuum drying as at least a part of the process has the greatest usage and surest, most proven demonstration of spent fuel and container dryness. Vacuum drying uses pumping systems to reduce the pressure within the closed spent fuel container system (the vacuum), so that, even with very low decay heat rates from the spent fuel, any liquid water will flash to water vapor and, together with any other gases, be removed by the very system that is establishing the vacuum within the spent fuel container. Dryness of the radioactive contents is also easily measured as part of maintaining the vacuum. Once the proper dryness has been achieved, the system is back-filled with an inert gas, as discussed above. Utilities today are generating a large amount of spent nuclear fuel that has been exposed to longer periods in-reactor to extract more energy from the contained uranium (known as high burnup fuel), and that cannot be kept in wet storage for as long as desired because of decreasing margins to spent fuel pool capacity limits. A design that addresses these technical limitations of current systems better than any other technology today is one of the primary advantages of the systems and methods described herein. This method can achieve canister dryness with far shorter vacuum drying times and with much less concern over, and need for active control of, the temperature of the spent fuel. It achieves this outcome without compromising the proven and effective use of vacuum drying, but vacuum drying, in combination with the technology described herein that minimizes the initial water in the canister or cask, assures enhanced spent fuel dryness for long term material integrity and stability.

Other regulatory requirements that must be complied with by the system design for storing, transporting, or disposing of radioactive materials include: (1) Prevention of nuclear criticality (defined as the condition when Keff≥1.0) with a 5% safety margin under the most adverse conditions of geometry, temperature, fuel condition, enrichment, and moderator presence for normal, off-normal, and accident conditions; (2) Structural stability with no failures to meet the stability requirements of regulations for normal, off-normal, and accident conditions; (3) Shielding of the radioactive material such that all regulatory requirements for ionizing radiation dose rates are met to protect both operators and the general public for normal, off-normal, and accident conditions; (4) Containment or confinement of all radioactive material within the package such that regulatory limits on releases of such material are achieved for normal, off-normal, and accident conditions; and (5) Various other regulatory requirements that depend on the particular function (storage, transport, or disposal) that the packaging must perform.

B. METHOD DESCRIPTION

One of the objectives of this invention is to assure that the control of key parameters in hazardous material package system designs for ASTRID applications is greatly enhanced to improve safety, security, and cost for the ASTRID waste-handling life-cycle, especially for nuclear plants of western designs and other generators of hazardous waste material. One key concept in the invention is the almost total replacement of the inert gas within the spent fuel/radioactive/fissionable/hazardous material canister or cask (typically used with current ASTRID system designs) with a metallic material that has better parameter control and enhanced safety, security, and cost features than ASTRID canisters or casks filled with inert gasses.

The method herein is primarily, but not exclusively, discussed, focusing, for illustrative purposes, on encasing spent nuclear fuel and other radioactive, fissionable, or hazardous materials, especially for use at U.S. reactors and reactors of western design (although other reactor designs may also use this invention efficiently), that have a broad range of exothermic characteristics (depending on enrichment, burnup, fuel design, cooling time, etc.), rather than for hot fuel taken directly from the reactor, although with the selection of the appropriate, encasing FAE material, the method can still be used. This may still allow some encasement material to remain in a liquid state for a limited period, but additional storage of the encased and contained spent fuel on an indoor or outdoor pad for long-term air-cooling will allow full encasement solidification before transport, if the regulations of that country prohibit transporting a liquid. The liquid encasement material does not significantly inhibit the additional shielding, moderator exclusion, heat transfer, or radioactive/fissionable/hazardous material retention capabilities of the proposed invention. Indeed, the liquid encasement will improve safety under accident conditions because, for large accident conditions on the transport cask, impact loads will be spread over a larger surface, reducing local loads and the prospect of experiencing failure of the containment vessel (the vessel enclosing the structure for the metal encasement of the hazardous waste material).

Many materials for use in backfilling the canisters and casks loaded with spent fuel or other included hazardous waste materials within these embodiments are known, chief among them FAE materials. The included discussions herein outline the reasons why these materials make very good technical, safety, operational, and cost sense for the next generation of ASTRID package technology.

See Table 1, below, for a representative sample of fusible alloys and eutectics, with their important characteristics and properties. Additionally, see Wikipedia: Fusible Alloy; https://en.wikipedia.org/wiki/Fusible_alloy, which contains further information on FAE materials, and its contents and reference citations are incorporated herein by reference.

TABLE 1

Examples of Fusible Alloys and Eutectics, with Metal Percentages Specified for the Resultant Alloy or Eutectic

| Bismuth (Bi) % | Lead (Pb) % | Tin (Sn) % | Cadmium (Cd) % | Melt Temp ° F. | Density g/cc |
|---|---|---|---|---|---|
| 50.0 | 25.0 | 12.5 | 12.5 | 149 | 9.73 |
| 50.0 | 26.9 | 12.7 | 10.4 | 149 | 9.29 |
| 50.1 | 26.6 | 13.3 | 10.0 | 158 | 9.76 |
| 50.0 | 26.7 | 13.3 | 10.0 | 158 | 9.29 |
| 38.4 | 30.8 | 15.4 | 15.4 | 160 | 9.71 |
| 50.0 | 25.0 | 12.5 | 12.5 | 165 | 9.29 |
| 27.5 | 27.5 | 10.5 | 34.5 | 167 | 9.55 |
| 50.0 | 34.5 | 9.3 | 6.2 | 171 | 10.03 |
| 50.0 | 31.3 | 18.8 | | 176 | 9.31 |
| 50.0 | 25.0 | 25.0 | | 200 | 9.31 |
| 50.0 | 31.2 | 18.8 | | 201 | 9.82 |
| 66.7 | 16.7 | 16.7 | | 201 | 9.31 |
| 50.0 | 31.3 | 18.8 | | 202 | 9.31 |
| 62.5 | | 37.5 | | 202 | 9.34 |
| 50.0 | 18.8 | 31.3 | | 202 | 9.32 |
| 55.6 | | 33.3 | 11.1 | 203 | 8.83 |
| 50.0 | | 25.0 | 25.0 | 203 | 8.87 |
| 47.0 | 35.5 | 17.5 | | 208 | 9.92 |
| 50.0 | 18.8 | 31.3 | | 208 | 9.32 |
| 50.0 | 30.0 | 20.0 | | 212 | 9.31 |
| 55.6 | 11.1 | 33.3 | | 212 | 9.33 |
| 42.1 | 42.1 | 15.8 | | 226 | 10.06 |
| 40.0 | 40.0 | 20.0 | | 235 | 9.93 |
| 50.0 | 10.0 | 40.0 | | 240 | 9.33 |
| 36.5 | 36.5 | 27.0 | | 243 | 9.70 |
| 33.3 | 33.4 | 33.3 | | 253 | 9.49 |
| 50.0 | 50.0 | | | 257 | 9.28 |
| 30.8 | 38.4 | 30.8 | | 266 | 9.63 |

As is evident, there is an abundance of FAE materials to select from, and the selection will be guided by many factors, such as the particular hazardous waste material, form of the content, heat generation of the content, heat generation limits of the loading area, cost of the FAE material and its installation, solidification time of the FAE material, the ability to transport FAE materials in a liquid form, proximity of the time for transporting the loaded package, and several other considerations, including whether or not environmental regulations will permit use of lead or cadmium in disposal-related packages for spent fuel, radioactive materials, fissionable materials, and other hazardous material forms.

If lead and cadmium are precluded as constituents for prospective FAE materials, then it is preferred that the bismuth-tin (Bi—Sn) family of eutectics be a primary, but not exclusive, FAE material form for use in loading (backfilling) packages to encase the hazardous waste materials discussed herein. One particular form is Bi 62.5%-Sn 37.5% whose melting point of 202° F. may be very satisfactory for loading the particular spent fuel, radioactive, and fissionable waste materials at nuclear sites. The melting point is such as to make the FAE material a liquid below the boiling point of water, reduce the propensity of that FAE material to trap or hold water (discussed later), and make it easier to remove any trapped water. Also, with that specified percentage of tin, the FAE material will have acceptable flow characteristics. Of course, there are other "blends" of the Bi—Sn eutectic family: typically, using a higher percentage of Bi lowers the eutectic melting temperature, and using a higher percentage of Sn improves the flow characteristics of the eutectic. Such considerations are part of the system design and operating conditions' evaluation for any specific, FAE-based ASTRID system.

1. Regulatory Compliance and Design Considerations

Based on the regulations that control radioactive material storage and transport, as an example, there are four primary groups of design features that must be rigorously controlled to meet regulatory safety requirements for storage and transport. These functionalities that all radioactive material packages typically must include in all design requirements and design bases for normal, off-normal, and accident conditions are very design-limiting in comparison to other hazardous waste materials: criticality control to prevent a power excursion (with increased radiation and heat generation) in the package; conduction or convection of decay heat to the surface of the package to assure the hazardous waste material remains within the design temperature range; confinement of the hazardous waste material so that any leakage to the environment meets all regulations and package design requirements; and radiation shielding (radiation capture/attenuation) to assure prospective doses/dose rates meet all regulatory requirements and package design bases. The methods herein offer dramatic improvements in these functionalities over any other hazardous waste materials packages, including spent fuel storage/transport system designs, proposed or in use today, by replacing a gas with a metal. The following summarizes how this is done for spent nuclear fuel, which is used herein only for an example.

First, with the backfill of the package using fusible alloys or eutectics, moderator exclusion is achieved; with no moderator, neutrons cannot become thermalized, so that criticality becomes literally impossible by nuclear physics; nuclear reactor spent fuel or fissionable nuclear materials, for instance, are designed so that a moderator, such as water, is required to allow the fuel to achieve criticality; if a moderator is always excluded in the amount necessary to achieve criticality, criticality can never occur; this also results in a basket or container design (the structure that physically holds the spent fuel or other radioactive, fissionable, or hazardous material) that is far simpler to design, fabricate, and install; material selection and basket assembly will be less expensive due to simplicity of design and the elimination of special thermal neutron absorber materials and their attachment fixtures; additionally, the backfill with fusible alloys or eutectics assures that the contents' geometry remains fixed; this is very helpful in criticality analysis and uncertainty reduction, and in mechanically and uniformly immobilizing contents to prevent impact on the packaging interior or creating local shielding problems where exterior radiation dose rates can become higher.

Second, with a solid or liquid material backfill, such as described, heat conduction and transfer from an exothermic (e.g., radioactive) material to the cooling surfaces of the packaging are enhanced by a factor of about 50, meaning that the spent fuel or other hazardous waste material remains cooler, further from the design basis limits of materials so that safety margin is substantially enhanced. Since the backfill material encases all the hazardous waste material in a confining and durable coating, the containment of these materials is substantially greater (as measured by retention fractions under normal, off-normal, and accident conditions) than that for an inert gas backfill. Second, there is little pressurized gas that serves as a motive force to expel hazardous waste material if the containment were to be breached under beyond-design-basis events; and, finally, the solid or liquid backfill offers a substantial strengthening of the package, bolstering the containment boundary's resistance to impact or penetration, and reducing the impact loads on the hazardous waste material structure, offering a substantial increase in the safety margin to the structural failure of the package contents.

Third, with a solid or liquid material backfill such as described, it also becomes part of the package shielding, and radiation attenuation and capture are significantly improved with the thick material encasing the package's hazardous waste materials; this also utilizes a foundational principle of radioactive material shielding efficiency, which says that placing shielding closer to the radiation source is the most effective and efficient form of shielding; this means that less shielding will be needed on the exterior of the packaging, making the packaging lighter and less costly, and the package less expensive to handle, transport, and place into storage configurations.

An additional consideration here is that with the spent fuel or other radioactive, fissionable or hazardous material forms so tightly encased within the backfill material, security is greatly enhanced because gaining access to the inside of the cask/canister still does not achieve access to the spent fuel/radioactive/fissionable material, meaning that this method significantly complicates any plans for diversion of such materials and denies access to those materials by people without proper access tools/facilities for extended periods.

Other aspects of regulatory compliance are also achieved, and these will be clear to those skilled in the current art of radioactive and hazardous material storage, transport, and disposal ASTRID package technology for U. S. or western nuclear plant design.

2. Materials, Methods and General Operations a. Materials and Methods

The basic, fundamental approach for this method is to fill the containment vessel (e.g., cask, canister, combination of cask and canister, compartments therein, etc.) or just compartments therein with a liquid, metallic material that hardens as its temperature decreases below its melting point, encasing the hazardous waste material located within the containment vessel, thereby encapsulating the hazardous waste material. Simplifying the ability to fabricate, to install the backfill, and to load the system with its hazardous waste material is of paramount importance in allowing any spent nuclear fuel storage, transport, and disposal technology to be used in U.S. and western nuclear power plants or other plants, worldwide, in relation to what they currently perform when placing spent fuel into dry storage. As an example, the space requirements and operational complexities of the FAE material backfill system must be simple and comparable in difficulty to what is presently done for spent fuel loading, vacuum drying, and inert-gas backfill.

Regarding backfill material, the use of FAE materials would appear to be the simplest of the liquid backfill materials to use. The use of liquid metals in repetitive and sophisticated, high volume applications is uncommon, but FAE materials are well understood within many industries for far different applications than are disclosed in this method. The use of the FAE materials with storage, transport, and disposal of hazardous waste materials is a unique application that has not been used in the U.S. over the more than 70 years of the commercial generation of nuclear spent fuel and radioactive waste. There are dozens of desirable FAE materials that have liquidus and solidus or melting temperatures between 100° F. and 300° F. With such flexibility, selection of the correct FAE material may be based on the spent fuel, radioactive, fissionable, or hazardous material volume, quantity, size or shape, age, heat generation rate, dimensions, backfill method, or material content of the particular FAE material. With FAE materials having such characteristics, either a system that is pre-loaded at the fabrication or other facility with the FAE material, or, alternatively, a gravity drain, hydraulic/pneumatic, or pump-assisted system could be used to backfill the appropriate cavities/compartments/containers of the canister or cask at the nuclear facility. The use of FAE materials may be accomplished under the water of the liquid storage pool or within the liquid storage pool enclosure (a unique feature of this method's use of FAE materials and an excellent approach to improve safety due to the shielding and cooling of the water), and selection of the proper FAE material can assure no threat of extensive boiling beneath the pool surface if materials with a higher liquidus/solidus or melting temperature are used.

Furthermore, hazardous waste material transport in casks with FAE materials in a liquid state is also feasible and safe. Inventions discussed later show that the free-surface effect of liquid material can be greatly diminished, and even under the occurrence of beyond-design-basis events, the puncture of the cask or canister body results in a self-limiting release of the liquid. Upon exiting the damaged cask, the liquid will solidify rapidly, blocking flow of further material while retaining any captured radionuclides from the hazardous waste material.

3. Material and Method Embodiment Categories

Because there are several major considerations in this invention for the optimal system approach to use FAE materials most effectively for such hazardous waste materials, the following categorization of these considerations will be used to describe the several preferred embodiments: Design of the ASTRID System Using FAE Materials; FAE Material Loading Methods for the System; and System Content Loading Operations. These are discussed separately in the following subsections.

a. Design of an Astrid System Using FAE Materials

There are at least four preferred embodiments for a new design of an ASTRID system to contain the hazardous waste materials, as discussed below.

(1) Preferred Embodiments of New ASTRID System Designs Using FAE Materials

With the advantages of encasing the package's content materials in FAEs, extensive design and material simplifications are facilitated. The preferred embodiment discussed here is just one approach that is preferred, and there are substantial variations to this embodiment that would be apparent to those skilled in the art of such packaging technology.

In this embodiment, an ASTRID system packaging (or cask) with a cross-sectional geometry of either a square or a rectangle will allow a basket (the array of vertical tubes on the interior of the packaging or canister, each holding a single or a plurality of discrete hazardous waste forms) that fits the exact shape of the external body of the packaging, thereby minimizing the weight of the loaded package, when compared to a packaging with cylindrical cross-section, the preferred geometry of today's ASTRID systems. For example a 6×6 array of basket tubes could be square and could fit snugly in a packaging of square cross-section, making for highly effective content heat transfer, while minimizing the amount of FAE material necessary or the amount of water that might occupy the package interior, which contributes to reducing in-plant handling weights and the time to remove the water before package closure.

Figure 1A:
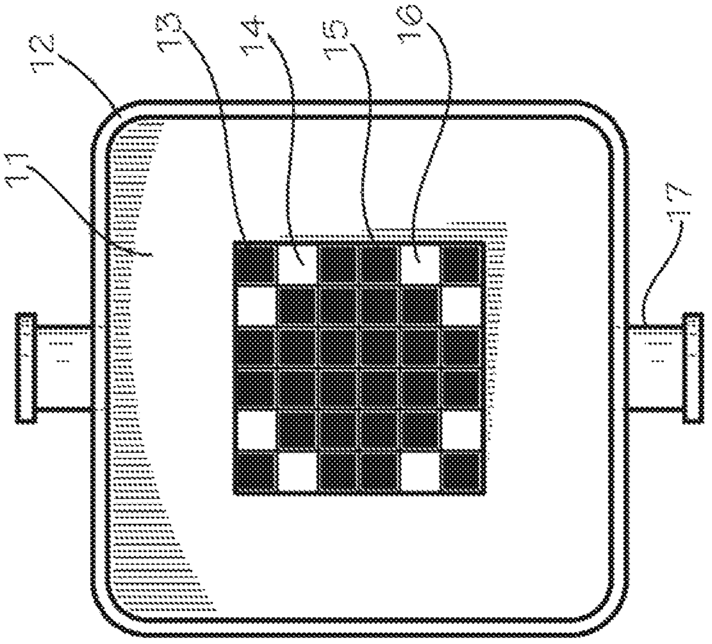

FIGS. 1A and 1B shows such a representative embodiment of this new ASTRID system cask. The parts in FIGS. 1A and 1B are indicated in Table 2 as follows:

TABLE 2

| Part | Reference Numeral |
|---|---|
| Cask Body | 11 |
| Neutron Shield | 12 |
| Basket | 13 |
| Storage Cell [note: same as 16] | 14 |
| Storage Cell (With hazardous waste material and FAE material) | 15 |
| Storage Cell (With hazardous waste material and no FAE material) | 16 |
| Lift/Rotation Trunnion | 17 |

The materials for the cask body 11 (herein also called the overpack, packaging, or external body) of FIGS. 1A and 1B can include any of the high-strength steels (e.g., ferritic steels, stainless steels), ductile cask iron (DCI), high-strength aluminum alloys, or similar metals that are strong, ductile, stable, and corrosion resistant. Preferably, a neutron shield 12 surrounds the cask body 11. The cask can be moved with a crane by engaging the lift/rotation trunnions 17 that extend outwardly from the sides of the cask.

With this ASTRID package design using FAE material, the basket tube structure should have several design considerations that simplify FAE placement in the basket 13. The design of the basket 13 should use individual storage cells for discrete hazardous waste material geometries and may be an array of long, square-cross-section boxes or other suitable geometries for the cask and hazardous waste materials' design, having an opening at the top that is sized to assure vertical FAE material flow around the stored hazardous waste material within the cell for the type of FAE's viscosity and temperature. The basket material can also be very similar or identical to the cask body material, and the inclusion of thermal neutron absorbing material in the basket structure is unnecessary, since there will be no moderator in the basket area of sufficient quantity to permit thermalization of neutrons that may be emitted by the package's hazardous waste materials and cause $K_{eff}$ to exceed 0.95 (1.0 minus a 5% conservative margin of safety). The basket 13 may be designed such that each vertical cell has no interrupted walls or gaps along the full height of each of the vertical storage cells' walls. This prevents the liquid FAE material from having to flow laterally across the vertical basket system during content loading, forcing the liquid to move a fixed volume of viscous fluid though a much larger and heavier volume of viscous fluid against the resistance of other installed fuel assemblies. Rather, it is preferred, but not necessary, that each storage cell 14-16 have uninterrupted walls that fit to the bottom of the canister or cask, meaning that for system designs using FAE material pre-installed before content loading, where a small amount of pre-installed FAE material that has been heated to a fluid state is displaced during the lowering of spent fuel or other hazardous waste forms, the FAE material is forced upward within its distinct storage cell, filling that cell as the hazardous waste material is lowered into the cell, displacing some of the liquid FAE material. The cask internals and basket structure are tightly mounted to the cask-body bottom plate (CBP), and FAE material can fill the cask internals up to a level above the spent fuel rods, consistent with being able to vacuum dry the cask internals. For optimal heat transfer, the basket structure should have substantial hard contact area with the cask inner wall. Additionally, areas within the cask internals may be kept free of FAE materials, in accordance with the particular design. It is also possible, but not necessary, that areas peripheral to the basket region, surrounding the storage cells, can be filled with FAE material (or other materials that exclude water) to the desired level as long as heat transfer from the fuel to the basket structure to the cask inner wall is adequate for the design bases of the ASTRID system cask.

Another embodiment of the basket 13 would include a design of individual circular, rectangular, square, or other cross-section storage tubes, sealed at one end (non-loading end), that would hold one or more storage containers or assemblies. In this embodiment, for hazardous waste material, such as nuclear spent fuel, as an example, a discrete fuel assembly would be loaded into each storage tube, the tube would be filled with FAE material at the reactor or nuclear plant site, and the tube may or may not be closed at the end where loading occurs with a lid having an opening that is covered by a mesh vent design to allow vacuum drying. The storage tube would be returned to storage in the liquid storage pool of water until it is loaded into an ASTRID system cask in the spent fuel pool for spent fuel storage or transport or storage/transport/disposal. Such a cask would have a basket super-structure that can hold a plurality of storage tubes in an array such that the loaded superstructure serves as the completed basket in the cask and is licensed for storage, transport, and disposal, as may be desired. Further filling of the cask by FAE material, as may be desired for the particular design, would occur after the storage tubes have been fully loaded in the cask cavity. As a variant of this design approach that is discussed further below, each hazardous waste material element (e.g., spent fuel element or fuel rod container or other hazardous waste form) with encasing FAE material might also be loaded into a tube separate from the basket tube of the cask or canister and having its own lifting and handling approach, with said separate tube designed for loading into a fixed basket tube storage location of the cask or canister system. This might be necessary for regulatory compliance reasons.

A further embodiment of the basket 13 involves a design wherein there are storage tubes within the basket that are not filled with FAE material. This allows for only a small reduction in heat removal, no significant increase in criticality ($K_{eff}$) concerns, and only small increases in peak temperatures for exothermic materials that may be hazardous waste materials. Such a design feature allows for more of the system's design weight capacity to be assigned to the hazardous waste materials, thereby maximizing the hazardous waste material content of the package. As an example, in the outer rows of storage tubes in the basket structure, the filling of only alternating storage tubes with FAE material can reduce the package weight by several thousands of pounds. The same might be done for several storage locations scattered within the basket or even in the central region of the basket design. By placing hazardous waste materials in these non-FAE-filled storage locations that have the appropriate design heat generation rates and reduced levels of fissionable materials, the package hazardous waste capacity may be increased with no significant change in the peak criticality ($K_{eff}$) levels or to the other design requirements of the ASTRID system. FIGS. 1A and 1B show some example locations where storage tubes do not contain FAE materials (such locations are, of course, dependent on the actual system design, and FIGS. 1A and 1B show such locations for illustration only).

An additional basket embodiment is the use of a separate tube (FIG. 4) from the cask or canister basket storage tubes in which each hazardous waste material element (e.g., spent fuel element or fuel rod container or other hazardous waste form) with encasing FAE material would be placed, and these separate tubes each located within individual storage tubes of the basket, the individual storage tubes of the basket serving as structural and thermal conductance sleeves around the separate tubes containing hazardous waste and FAE material, with each tube having its own lifting and handling approach. These separate tubes could be loaded with their hazardous waste design content, filled to the necessary level with FAE material using methods disclosed herein, either while the separate tubes are within the basket structure tubes or before placing the separate tubes within the basket structure tubes, should such a design approach be necessary for a particular ASTRID cask system design or for regulatory requirements having very tight boundaries of interpretation on ready retrievability of the hazardous material.

Figure 4A:
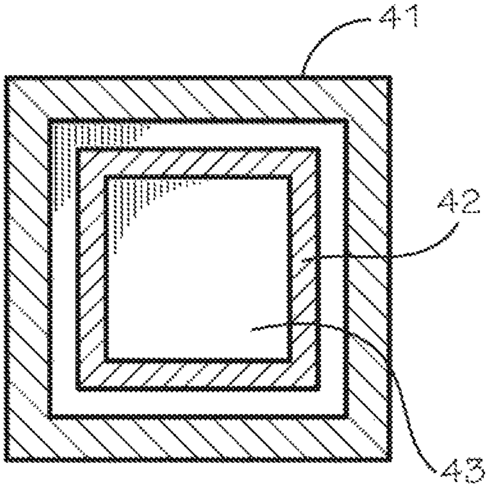
FIG. 4A shows a top view of one separate tube within a basket receptacle tube of the cask or canister.
Figure 4B:
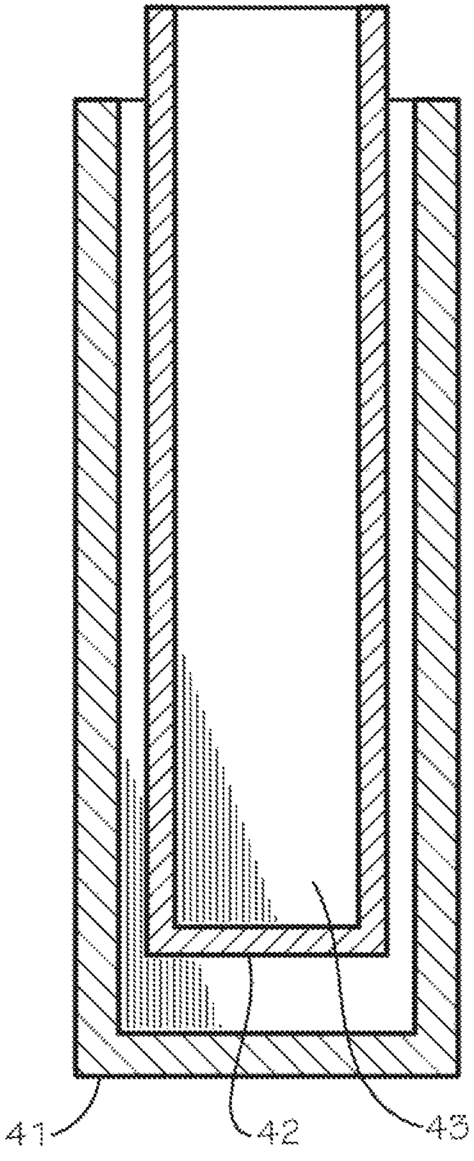
FIG. 4B shows a vertical (elevation) view of one separate tube being lowered into one basket receptacle tube, showing how the basket receptacle tube serves as a structural support and thermal conductance sleeve surrounding five surfaces of the separate tube.

FIGS. 4A and 4B show such a representative embodiment of this new separate storage tube within the basket receptacle tube in the ASTRID system cask. FIGS. 4A and 4B illustrate an embodiment where a tube is used separate from the basket receptacle tube of the cask or canister, with the separate tube containing the hazardous waste and FAE material, and designed for loading into a fixed basket receptacle tube storage location of the cask or canister system. The parts in this embodiment are indicated in Table 3 hereafter.

TABLE 3

| Part | Reference Numeral |
|---|---|
| Basket Receptacle Tube | 41 |
| Separate Insert Tube | 42 |
| Hazardous Waste and FAE Materials | 43 |

FIG. 4A shows a top view of one separate tube 42 within a basket receptacle tube 41 of the cask or canister. The separate tube 42 encloses the hazardous waste and FAE materials 43, and is essentially a vertically oriented, elongated receptacle separate from the receptacles of the body of the cask or the canister and has its own lifting and handling apparatus that may or may not be different than the lifting and handling apparatus associated with the cask, canister, or hazardous waste form. FIG. 4B shows a vertical view of one separate tube 42 being lowered into one basket receptacle tube 41, showing how the basket receptacle tube 41 serves as a structural and thermal conductance sleeve surrounding sides of the separate tube 42.

The materials for the basket receptacle tube 41 of FIGS. 4A and 4B have been defined previously to include any of the high-strength steels (e.g., ferritic steels, stainless steels), ductile cask iron (DCI), high-strength aluminum alloys, or similar metals that are strong, ductile, stable, and corrosion resistant. The materials of the separate insert tube 42 of FIGS. 4A and 4B can include any of the high-strength steels (e.g., ferritic steels, stainless steels), ductile cask iron (DCI), high-strength aluminum alloys, or similar metals that are strong, ductile, stable, corrosion resistant, and have appropriate thermal conductance properties for the particular ASTRID cask design. The hazardous waste material and FAE material have been previously defined.

For any ASTRID system cask having a basket and supporting structure (rather than a canister) for its internals, and in the event that the cask will require handling or transport that departs from a vertical orientation while the FAE material is still in liquid form, it is a preferred design condition that the cask may be equipped with a Free Surface Suppression (FSS) lid, interposed between the cask containment lid and the FAE surface, to prevent the FAE encasement liquid from hardening with/against the main cask lid, restricting reopening of the cask, and to prevent free-surface effect motion that may cause movement of the center of gravity, which might induce instabilities in handling, down/up-ending, and transport, if avoiding such effects is necessary for licensing. The FSS lid may be positioned for seating and, if necessary for other considerations, sealing, on a lip structure that protrudes from the cask inner wall. Other lid designs as are apparent to those skilled in the art are also possible. The FSS lid will have a vent system on the lid to allow vacuum drying using the vent and drain fittings and fixtures on the containment boundary lid and extending into the cask internals. An exit port on the top of the FSS lid, roughly centered, that extends through the FSS lid into the region just above the FAE material, with that port also joined to a plurality of lines drilled through the thickness of the lid to the FSS lid's circumferential periphery that is always above the FEA material level when the cask/canister is vertical provides one such vent system. Note that hot water or an external heating device can clear plugging events for the right FAE material, and the vent only needs to be open when vacuum drying is occurring. The FSS lid vents should be checked before installing the final closure lid(s) and starting vacuum drying. The FSS lid will be attached to the cask inner shell by one of several ways to prevent the FSS suppression lid from becoming a loose fixture within the cask. This can be done with a plurality of: modified bayonet connectors; interrupted screw connectors; levers that push to insert and pull-to-remove retainer pins into and from the cask wall (e.g., anchored in the FSS lid with a lever-operated, prescribed linear motion of the pins out from the edge of the lid to lock into recesses in the cask's inner wall, and a lever-operated pull-to-return motion that returns the pins into the thickness of the lid); or a variety of other methods known to those skilled in the art. The method should be remotely and relatively quickly operable from above the cask by operations personnel. If the cask is to be transported while the FAE material is still liquid, it may be necessary to open the cask after it has been dried and to close the FSS lid vent so there will be no liquid that flows into the region above the FSS lid that could interfere with the cask main lid(s). With the main cask lid reinstalled, vacuum drying would then be repeated prior to transport.

The presence of neutron generation in the package's hazardous waste means that a neutron shield of conventional material for such shielding may likely be necessary, depending on the particulars of the hazardous waste materials, the design requirements, and the package design. Such neutron shielding may be attached to the external wall of the cask body or placed within the cask body shell using conventional attachment or installation methods. Without hazardous waste materials that generate neutrons, such shielding should not be necessary.

External and internal closure and handling devices for this new ASTRID system design can be very similar to such devices used with present ASTRID system designs.

(2) Preferred Embodiments of Modifications to Currently Licensed ASTRID Systems for Using FAE Materials Currently licensed ASTRID systems can also be modified to use FAE materials. Such design and license modifications to an existing design could save time, as well as design and engineering effort, and the cost of amending an existing design and license for that system to use FAE materials may be much less than that for a new design. There are several considerations that must be carefully reviewed and addressed in such a design modification so that key issues become part of the design bases: (a) The attachment provisions of the basket storage locations (tubes) within the complete basket structure and that structure's attachment provisions to the cask inner shell or wall must assure that appropriate design thermal conductivity is achieved while meeting all mechanical loading conditions for the system's design bases; (b) The use of a separate tube (FIG. 4) from the cask or canister basket storage tubes in which hazardous material design content (e.g., spent fuel, radioactive, or fissionable material) would be placed, and these separate tubes each located within individual storage tubes of the basket, the individual storage tubes of the basket serving as structural support and thermal conductance sleeves around the separate tubes containing hazardous waste and FAE material, with each tube having its own lifting and handling approach, should also be considered. These separate tubes could be loaded with hazardous material design content, filled to the necessary level with FAE material using methods disclosed herein, either while the separate tubes are within the current ASTRID cask system basket structure or before placing the separate tubes within the basket storage tube structure, should such a design approach be necessary for a particular current ASTRID cask system design or for regulatory requirements having very tight boundaries of interpretation on ready retrievability of the hazardous material. (c) Water removal design features that may be necessary for the amended design if such design tends to retain, trap, or hold water must be addressed; preferred embodiments of this are addressed below for new ASTRID system designs and are also appropriate for modifications to current ASTRID system designs; (d) FAE material loading methods discussed below for new ASTRID system designs would apply to amending current ASTRID system designs for use of FAE materials; this would include installation of low-melting point FAE materials in an ASTRID system cask prior to delivery to a loading site; injection of any FAE material in the cask cavity while the ASTRID system cask is on the liquid pool floor; injection of any FAE material in the cask cavity with the top of the ASTRID cask system above the pool surface, with water removed and the fuel being cooled by a cooling system; and dry loading of FAE material in a dry ASTRID system cask at an interim storage facility, any storage site, any disposal site, or repository using an enclosure (e.g., hot cell); (e) Hazardous waste loading methods discussed below for new ASTRID system designs would apply to amending current ASTRID system designs for use of FAE materials; this would include hazardous waste loading operations with FAE material pre-installed before arriving at the loading site; and hazardous waste loading operations when FAE material is injected after the loading, either wet loading or dry loading; and (f) The use of an FSS lid, as discussed above, may also be necessary as a modification to a currently licensed ASTRID system.

(3) Preferred Embodiments of Water Removal Methods for ASTRID System Designs Using FAE Materials That May Trap, Retain, or Hold Water In designing new ASTRID system packages that use FAE materials, or in amending the design and license for current ASTRID system packages, it is most important to have operational features and procedures that preclude trapping, retaining, or holding water that might occur during the loading of the FAE materials and/or the hazardous waste contents into the packaging or that remove such water prior to storage, transport, and disposal. Retention of water may lead, in the long term, to corrosion concerns, unless the retained water is kept to very strict minimal values for a given system design.

The most likely water trapping events might involve low melting point FAEs (FAEs with melting points well below the boiling point of water, especially if the FAE materials are installed under water at depths similar to those in spent fuel pools (35 ft. to 45 ft.). At such depths, the boiling point of water can be in the range of 260° F. to 280° F., so that water entrapment in the liquid FAE material is possible. Using operating procedures with technical assistance from heating/cooling/drying system technology, water trapping can be reduced to a minimal quantity that can be accommodated by system design and licensing requirements.

Operationally, the complete installation of the FAE material in the basket structure containing hazardous waste according to its design requirements assures that both fuel cooling and the prevention of criticality events meet design and licensing requirements. Once that installation of FAE material has achieved the design-required conditions, the activity to remove potentially entrapped/retained water may be undertaken.

The removal of the potentially entrapped water involves the following steps.

First, no matter in what location the FAE material has been installed underwater, the best approach is to allow the FAE material to remain at a temperature above the boiling point of the water. With the FAE material installed in the basket enclosing the hazardous waste, there are no significant concerns about hazardous waste temperature or criticality. To simplify the maintenance and control of the FAE material temperature, one approach is to bring the ASTRID cask, loaded with both FAE materials and its hazardous waste to a location (for example, on a shelf of a spent fuel pool or on a cask stand mounted in the spent fuel pool) where the top of the cask is above the water level;

Second, at that point, specially designed heaters may be mounted on the inside of the cask (electrical heaters may be in the geometrical shape of long rods, a plurality of which can be placed in designed locations around the basket) if the hazardous materials' exothermic heating does not provide the necessary heat, and a specially designed lid is installed on the cask system. The heaters are used to keep the basket and FAE materials at a temperature above the boiling point of water (as a first order approximation guide, such temperature should assure that the FAE material is still liquid and that it is more than aboutl 0°-15° F. above the boiling point of water);

Third, the specially designed lid is tightly secured to the cask body so that both controllable vacuum and pressure conditions can be created within the cask cavity enclosure. The lid also has entry and exit ports so that both pressure/drain/vacuum and venting functions can be accommodated by the lid designed for this application to a specific ASTRID system cask design. As one embodiment, once the lid is attached to the cask top opening, the vent and pressure/drain ports on that lid may be used to remove any bulk water from the cask interior though use of a gas pressure system to expel water though the vent port and/or the use of a pumping system to remove such bulk water.

Fourth, with that lid as the interface system to control the trapped/retained water removal from the cask, a heating/cooling/vacuum system very similar to that discussed in U.S. Pat. No. 9,117,558 is connected to the lid and is used to remove residual water vapor, including that generated in the cask from the vaporization of the trapped/retained water as it is released by vaporization due to the heating of the liquid FAE material and hazardous waste materials, and by the vacuum drying system that is part of systems like the one in U.S. Pat. No. 9,117,558.

Fifth, based upon the specific design of the ASTRID system cask, lids, and ancillary systems, such water removal and vacuum drying operations may continue until the design and license requirements for a dry cask system are met. Then, final cask closure and sealing operations will be performed as required by the specific ASTRID system design.

Such conditions of water retention suggest why the use of the FAE material Bi 62.5%-Sn 37.5% eutectic, whose melting point is 202° F., may be very satisfactory for loading hazardous waste material elements (e.g., spent fuel elements, fuel rod containers, radioactive materials, fissionable materials, and other hazardous material forms) at nuclear sites. The melting point is such as to make the FAE material a liquid just below the boiling point of water, reduce the propensity of that FAE material to trap or hold water, and make it easier to remove any trapped water, since less heat is required to be added to the FAE material to assure that trapped water vaporizes and escapes from the molten FAE material.

The preceding invention has applicability for use with FAE materials that have some water retention characteristics. However, as another embodiment, for the design of the ASTRID cask or canister internals, especially regarding licensed ASTRID system designs that are modified to use FAE materials, it may be desirable to use some modest alteration to facilitate water removal from the cask or canister that may occur over time. The ability to drain and dry water in the cask or canister at several times during a storage period could be an important design consideration for certain design approaches.

Specific inventions for this encasement and containment technology using this type of FAE material include at least the following.

First, items enumerated in this discussion, above, may be used, to a greater or lesser extent, for this alternative approach to removal of trapped or retained water.

Second, a preferred embodiment, especially for current ASTRID systems being modified to incorporate use of FAE materials, that addresses very small quantities of potential water retention in the FAE material is that the cask internals structure exterior to the basket may be modified to include a plurality of a vapor condensation drain (VCD) structures, a pipe of cylindrical configuration of design-appropriate dimensions (or other geometry specific to the cask design) interposed between the basket structure and the cask inner wall, such that the VCD inner wall allows any small quantities of residual vapor to settle on the VCD inner wall surfaces, condense, and drain to the bottom of the cask. There may be structural, load bearing devices that are interposed between the VCD and inner cask shell for stability. Each VCD will act as a shell within which no FAE material is placed. FAE material may surround each VCD and join it to the cask inner shell, but the presence of the VCD opening and open drain path must be maintained. The VCD may be attached to the CBP, or it may be attached to the bottom space plate, discussed below; however, cut-outs or drainage openings in the base of the VCD and/or bottom space plate must allow water to collect on the CBP (a forging, plate, casting, or other piece that forms the last cask inner wall).

Third, the cask can have a bottom space plate (BSP) elevated off the CBP. The BSP may be on set-offs above the CBP or a cylindrical ring attached to the CBP; the cask's basket structure will be mounted on and attached to the BSP. The BSP will allow vapor condensate and excess water to drain into the cavity between the BSP and CBP (e.g., a plurality of drain openings can be placed through the BSP plate to permit water drainage into BSP/CBP cavity).

Fourth, there may also be a cask bottom drain valve (BDV) to drain this water from the BSP/CBP cavity before any vacuum drying. Otherwise, the water may be pumped out or removed by air pressure using the vent and drain connections of the cask's main lid(s). When placing the cask into storage or prior to transport, vacuum drying of the cask and backfilling with an inert gas will be performed. If the BDV is installed, it will be opened with the cask in a vented condition so as to drain out any residual water before vacuum drying begins. Otherwise, the water may be removed by air pressure using the vent and drain connections of the cask's main lid(s).

(4) New Package Design for Dry-Loaded Radioactive, Fissionable, or Other Hazardous Material Significant concerns with the storage, transportation, and disposal of certain radioactive, fissionable, and hazardous materials revolve around prevention of criticality and physical security of such materials to prevent diversion and undesirable uses of such materials. The use of FAE materials as part of the package designs used for storage, transport, and disposal adds substantial protection against moderator intrusion, easy personnel access to package hazardous waste materials, and dispersion of the contents for harmful purposes and objectives.

Classically, and for example only, these packages typically involve a smaller cask system that holds a canister containing hazardous waste materials, which is placed inside the protective cask system. The cask system is designed to offer protection against intrusion by any moderator materials and by unauthorized personnel. Typically, heat removal is not a major consideration in the design of this type of package.

Using FAE materials as both a moderator and unauthorized personnel exclusion technology, the invention herein incorporates two design aspects to accomplish a significant improvement in safety and protection of the materials and, therefore, of the public.

Figure 2A:
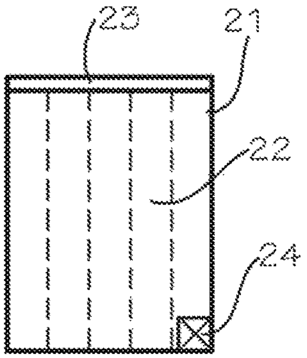
FIGS. 2A through 2D illustrate an embodiment of a package design for dry loaded radioactive, fissionable, or other hazardous material. Specifically.
Figure 2B:
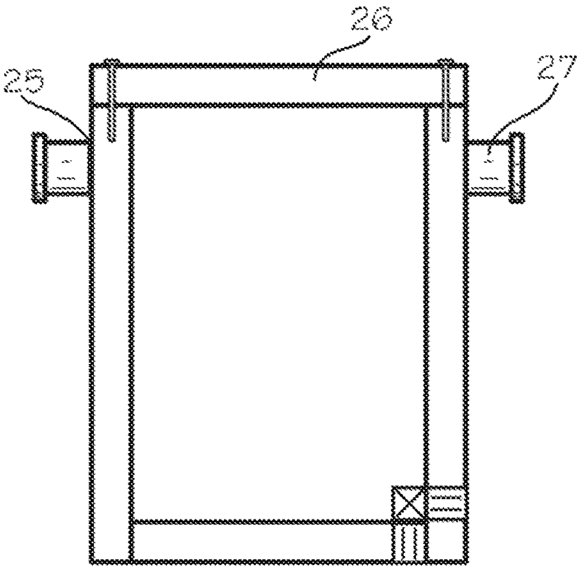
Figure 2C:
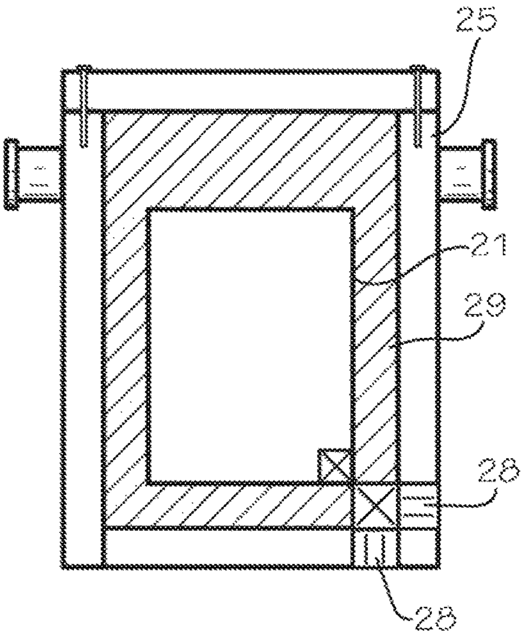
Figure 2D:
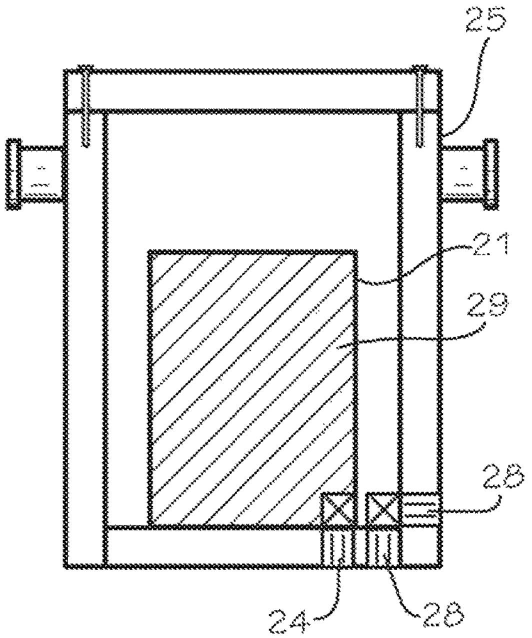

FIGS. 2A through 2D provides an illustration of preferred embodiments. The parts in FIGS. 2 through 2D are set forth in Table 4 as follows:

TABLE 4

| Part | Reference Numeral |
|---|---|
| Fissionable Material Canister | 21 |
| Fissionable Material Containers or Basket | 22 |
| Canister Lid | 23 |

TABLE 4-continued

| Part | Reference Numeral |
|---|---|
| Canister Drain Valve for FAE Material | 24 |
| Cask Body | 25 |
| Cask Lid | 26 |
| Cask Lift Trunnion | 27 |
| Cask Drain Valve | 28 |
| FAE Material | 29 |

With current packages designed using a cask as the outer protection and intrusion preclusion technology, the hazardous waste materials may be enclosed in separate cans or boxes, then sealed in a canister 21 (FIG. 2A) that is inserted into the cask body 25 (FIG. 2B) through the top opening, which has a lid 26 that can be closed, sealed, and secured with tamper-indication locks, as is illustrated in FIG. 2C. To use FAE material, the inner canister 21 may be enclosed in the selected FAE material within the cask using FAE material loading technology very similar to that described below. The FAE material then holds the canister 21 in the cask, making removal of the canister 21 very difficult until and unless the FAE material is re-melted and allowed to drain out of a drain valve 28 incorporated into the cask body 25, the drain valve 28 being highly protected by the design of the cask body 25 so that beyond-design-basis accident conditions cannot cause the failure of that drain valve 28. Re-melting technology involves the use of simple surface or internal heaters that raise the package temperature above the melting point of the FAE material, allowing the draining or pressurized expulsion of FAE material.

As an alternative preferred embodiment, as illustrated in FIG. 2D, the canister 21 can also be filled with the FAE material using loading technology very similar to that described below. This embodiment can be used by itself or in addition to the embodiment of FIG. 2C for a very high level of redundant security involving both physical protection and intrusion preclusion. Again, for removal of the FAE material, the canister 21 would have a highly protected valve 24 that would allow the draining of the FAE material once it had been re-melted by heating the canister 21. Re-melting technology involves the use of simple surface or internal heaters than raise the canister (or package) temperature above the melting point of the FAE material.

b. FAE Material Loading Methods for the ASTRID System

There are at least five preferred embodiments for FAE material loading methods in ASTRID system casks, as discussed below.

(1) FAE Loading with Installation of Low-Melting Point FAE Materials in an ASTRID System Cask Prior to Delivery to Hazardous Waste Loading Site In one embodiment, the cask or canister of the ASTRID system would be constructed so that the FAE material is pre-installed with the precise quantity required in each storage tube of the cask or canister using a fabrication facility or FAE-material-supplier to perform the initial FAE material loading into the cask or canister internals and basket region. The fabricated cask or canister would be delivered to the FAE material loading location, and all internals' surfaces would be cleaned and dried to remove foreign materials, if that process has not been accomplished at the fabrication facility. As a minimum, an inspection for internal cleanliness will be performed. The FAE material supplier's material will be loaded into the cask or canister basket region, within each storage location with the predetermined quantity to assure that there is sufficient FAE material to encase each fuel assembly and to fill the remainder of each storage cell to the appropriate level. FAE material may also be installed in regions peripheral to the basket structure to assure, if necessary for that design, there is a solid heat transfer path from the fuel to the cask or canister wall, to provide shielding continuity, and to exclude moderator, each per the system design. The FAE material may be loaded in a liquid form, using the FAE material loading location's heating and material transfer systems to convert the FAE material from a solid to a liquid. Another approach is to load the solid material into the cask or canister internals and heat the material within the cask or canister until it becomes molten. After loading of the FAE material, appropriate levels of the FAE material are verified.

See the discussion of the METAL system below for how the full loading process may be accomplished for subsequent loading of hazardous waste materials.

(2) Injection of FAE Material into the ASTRID System Cask while it is at the Hazardous Material Source Plant Site Alternatively, some sites, reactors or cask/basket designs may require the loading of the FAE material into the ASTRID system cask at the hazardous material source plant site. Therefore, at a reactor, for instance, in the selected FAE material loading area, a gravity drain, pneumatic, hydraulic, or pump-assisted system could be used to backfill the storage tubes and other locations within the cask or canister with the FAE material prior to or following fuel loading at the plant. A system of tankage and pumps would be necessary in the loading area, including a tank for the liquid FAE material, tanks for hot water or for electrical or other heating of the FAE material, and transfer systems for emptying and filling all tanks. The tank containing heated water (using internal heaters) would have its contents transferred into the tank containing the FAE material if it is in a solid condition, or the tank containing the FAE material may be heated with electrical heaters or other heating methods. Typically, steam would not be required and temperatures in the tanks and local environment will not become operationally extreme. The FAE material tank will also have heaters that can raise the temperature of the contained water and FAE material or of the FAE material alone if water is not used.

After the given time to liquefy the FAE material, any water in the FAE material tank is removed, as necessary, the FAE material tank discharge system is aligned to the insulated piping that leads to the canister/cask, and the liquid FAE material is transferred through a throttling device, or a pumping system begins to pump the FAE material into the storage tubes and other regions of the cask/canister, as designed. For FAE material loading before fuel is added, filling is stopped at the precisely predetermined level.

(3) Injection of FAE Material in the ASTRID System Cask while it is Immersed and on the Liquid Pool Floor As in the immediately preceding, the tankage system for FAE material and for water, along with heaters, a transfer system, and insulated piping would be required. An ASTRID spent fuel canister with its basket in a cask cavity or a cask with the spent fuel basket in its cavity would be loaded in the cask loading area of the pool (for BWR fuel and for loading that fuel prior to backfill, special design features in the spent fuel basket, special provisions for burnup credit and loading patterns of the spent BWR fuel, or, more likely, repeated partial loadings of BWR spent fuel followed by repeated FAE material backfills of those storage locations holding the BWR fuel may become necessary for licensing of the cask/canister design, since BWR spent fuel pools do not have boric acid or other thermal neutron absorbers added to the pool water to suppress reactivity of the spent fuel. Multiple repetitions of loading and FAE material filling steps may be necessary in regions of the basket for certain types, burnups, and enrichments of BWR fuel). On the operations floor level, the tank containing heated water (using internal heaters) would have its contents transferred into the tank containing the FAE material if it is in a solid condition, or the tank containing the FAE material may be heated with local electrical heaters or other heating methods. Typically, steam would not be required and temperatures in the tanks and local environment will not become operationally extreme. The FAE material tank will also have heaters that can raise the temperature of the contained water and FAE material or of the FAE material alone if water is not used.

After the given time to liquefy the FAE material, any water in the FAE material tank is removed, as necessary, the FAE material tank discharge system is aligned to the insulated piping that leads to the bottom of the canister/cask, and the liquid FAE is transferred through a throttling device, or a pumping system begins to pump the FAE material into the storage tubes and other regions of the cask/canister, as designed. Filling is stopped at the precisely predetermined level.

(4) Injection of FAE Material into the ASTRID System Cask after Fuel Loading and Water Removal while the Cask Top Opening is Above the Pool Surface A specific embodiment of this approach would have the ASTRID system cask (or its canister) basket loaded with spent fuel at the bottom of the pool. The cask would then be brought to the surface of the pool and positioned on a support stand or on a ledge extending from the pool wall, where the upper part of the cask extends just above the water surface, but the fuel is still below the surface. A special lid is (or has been) installed on the top of the cask, such lid having the ability to be securely sealed to the cask (or its canister) body. The lid has further features such that it has a vent and a drain port with a drain line that extends to the near the bottom of the cask (or its canister), as well as a plurality of ports that conduct FAE material from the tankage into the basket receptacle tubes to surround the fuel and into the peripheral areas surrounding the basket as may be specified by the design. Once the cask is securely positioned on the stand or on the ledge, the special lid is secured to the cask (or canister) body, and pneumatic/hydraulic pressure and/or pumping systems are used to evacuate the water from the cask interior. When this is accomplished, the liquid FAE material may be transferred from its tankage into the cask (or canister) interior, fully surrounding the fuel assemblies or rods in their storage tubes and as much of the basket periphery as prescribed by the cask system design. Upon completion and verification that the cask contains the requisite amount of liquid FAE material, the special lid may be removed, the interior of the cask inspected from above (it may be desirable to lower the cask below the pool surface for this inspection), the completion of trapped water removal from the FAE material accomplished, and the final canister (if used) and cask system lid installed, in preparation for vacuum drying and backfilling with an inert gas. Depending on specific cask system designs, the order of the water removal and FAE material loading may be reversed or both processes integrated. Again, this embodiment may be the preferred approach if the melting point of the FAE exceeds approximately 200° F.

(5) Dry Loading of FAE Material in a Dry ASTRID System Cask at an Interim Disposal/Repository Storage Facility, or Disposal or Repository Site Facility Typically, this operation might be desired for currently licensed ASTRID systems not containing FAE materials when they are delivered to nuclear facilities for storage or disposal or placement in a repository in order to enhance the safety and security of the system and make it much more suitable for long-term storage or disposal. Such a loading process would use many of the same processes and systems as discussed previously for use at other hazardous waste and reactor sites.

At these types of facilities where dry FAE material loading could be accomplished, such as at disposal or repository site interim storage facilities, or at the actual disposal or repository operations facilities prior to ultimate placement of the hazardous waste containment systems in said facilities, thereby completing the hazardous-material movement life-cycle, the use of FAE materials with higher liquidus/solidus or melting temperatures can also be considered. There is a substantial range of such FAE materials that would include: lead (67.7%)-tin (33.3%), melting point about 475° F.; bismuth (95%)-tin (5%), melting point about 550° F.; tin (95%)-bismuth (5%), melting point about 600° F., and many variations around several material combinations, with melting temperatures ranging up to about 650° F.

Initially, the cask system would be placed in a location that is very similar to a hot-cell, where shielding, atmosphere control, working platforms with tools, and personnel protection can be afforded by the facility. The cask (and canister, if used) would be vented, the vented gas tested for radionuclides, the canister (if used) lid removed), and a special lid or fixture designed for this loading operation would be installed on the top of the cask, such lid/fixture having the ability to be securely attached and/or sealed to the cask body. The lid/fixture has further features such that it has a vent and a drain port with a drain line that extends to the bottom of the cask/canister, as well as one port or a plurality of ports that conduct FAE material from the tankage into the basket structure to surround the fuel and into the peripheral areas surrounding the basket as may be specified by the design. The lid vent and drain ports are used for the installation and use of such a system as is described in U.S. Pat. No. 9,117,558, with the operation of that system providing heat removal and the proper non-oxidizing atmosphere.

After the given time to liquefy the FAE material, any water in the FAE material tank is removed, as necessary, the FAE material tank discharge system is aligned to the insulated piping that leads to the canister/cask, and the liquid FAE material is transferred through a throttling device, or a pumping system begins to pump the FAE material into the storage tubes and other regions of the cask/canister, as the design may call for. Filling is stopped precisely at the predetermined level. As is apparent to those skilled in the art, depending on the FAE material used, the exothermic characteristics of the hazardous waste materials, the temperature of the installed FAE material, the environmental temperature, the cask body temperature, and several other parameters, it may be necessary to maintain a heating system on or in the cask in order to allow the FAE material to fully enclose the hazardous waste materials prior to its solidifying. As an example, a heating pad or cup on/in which the cask body sits may be sufficient to keep the FAE material liquid until the hazardous waste materials are encased. The use of long electrical heaters inserted into the cask cavity is another possible approach.

Upon completion and verification that the cask contains the requisite amount of liquid FAE material, the special lid/fixture may be removed, the interior of the cask inspected, a canister (if used) lid installed, and a storage/transport/disposal cask lid installed. The cask atmosphere is established and controlled using a system similar to the system of U.S. Pat. No. 9,117,558 for vacuum drying and backfilling with an inert gas. After all proper checks and inspections are completed, the cask system may be moved into storage or placed into the repository.

c. System Hazardous Waste Loading Operations

There are at least two preferred embodiments for system hazardous waste loading into ASTRID systems, as discussed below.

(1) Hazardous Waste Loading Operations with FAE Material Pre-Installed Prior to Arriving at the Loading Site During these loading operations at a reactor site, as an example, several departures from the current dry storage/transport systems' loading process will likely be necessary. The most significant of these is the use of a Metallic Encasement Thermal Assist for Liquification (METAL) system, as shown in FIG. 3, to be used prior to loading of the spent fuel, in order to assure the FAE material is at an optimal temperature for lowering the spent fuel assemblies into their discrete locations within the basket structure.

Figure 3:
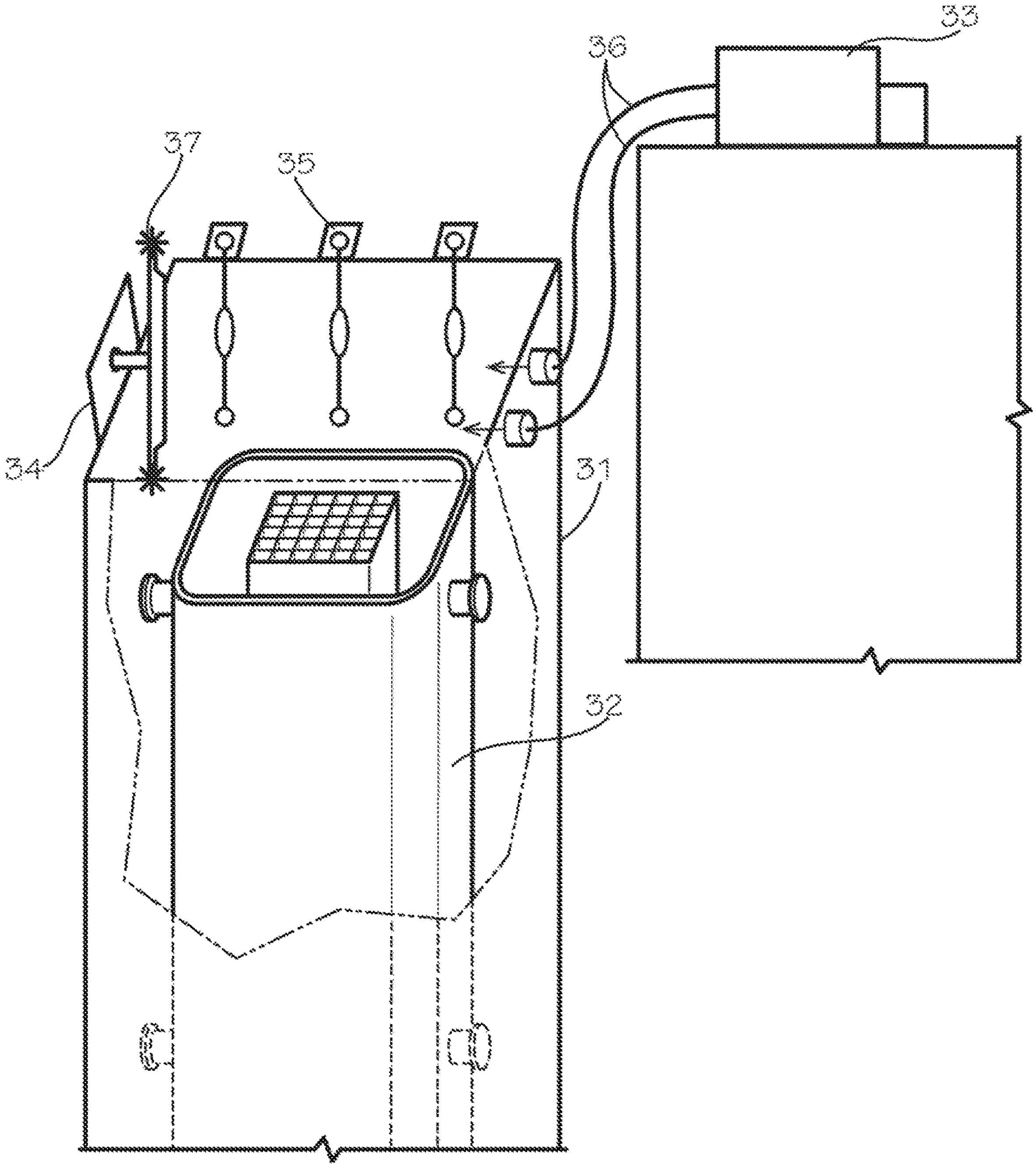
FIG. 3 illustrates an embodiment of a metallic encasement thermal assist for liquification (METAL) system.

FIG. 3 is an illustration of the METAL system loading structure. The parts in FIG. 3 are listed in Table 5 as follows:

TABLE 5

| Part | Reference Numeral |
|---|---|
| METAL Enclosure | 31 |
| Cask/Canister System | 32 |
| Heated Water Tanks and Water Supply Systems | 33 |
| Force Application Handling Device (FAHD) and Other Tool Storage | 34 |
| Heating Rod Assemblies | 35 |
| Insulated Hot Water Supply Lines | 36 |
| FAHD | 37 |

The METAL system is placed into the liquid storage pool of water near the location of the spent fuel racks that store the spent fuel, a location sometimes called the cask loading area of the pool, and would be characterized by an enclosure 31 or other structure of metal, with a circular, square, rectangular, or any other necessary cross-section that fits into the available space and allows the function to be performed. The enclosure 31, or loading structure, is necessary to contain the cask/canister system 32 to be loaded with spent fuel, facilitate liquefying and hazardous material introduction operations on the containment vessel, while providing limited access to water of the pool through the enclosure, and concentrate local heating of the FAE material installed in the cask/canister system 32. Therefore, the enclosure 31 should fit fairly tightly to the floor of the pool and be taller than the cask/canister system 32 to be placed within it. The METAL system would also have one or more heated water supply lines 36 that would be mounted on the enclosure 31 and extend into the cask/canister system 32 after its placement within the METAL system enclosure 31. For some types of higher liquidus or melting temperature FAE materials, it may be necessary to have the ability to install one or more electric heating rod assemblies 35, mounted on the enclosure 31, that can be remotely detached and placed within the basket structure to supplement water heating, thereby reducing the time to achieve the FAE material's liquidus/melting temperature. With such heating of the local pool water, it is a design consideration that leakage from the METAL enclosure 31 should be minimized except for the loss of water out the top of the cask or enclosure due to reduced water density from heating.

The METAL system water heating would be constituted by water tanks 33 containing internal or external heaters and pumps, mounted on the facility's fuel loading/operations floor, with water supply lines 36 that run to the METAL system enclosure 31 where the water application nozzle rod(s) are appropriately mounted on the enclosure 31 for ease of out-of-the-loading-path storage and for ease of remote installation and removal inside the basket for heating of the FAE material. A similar design approach is necessary for the supplementary electric heating rod assembly(ies).

The loading process, then, requires the installation of the METAL system into the liquid storage pool using local overhead cranes, the attachment of the heated water supply lines 36 and the electrical heating rods 35 from the fuel pool operating floor to fixtures on the METAL system enclosure 31, and the lowering of the empty cask/canister system 32 with its internal basket into the METAL system loading structure enclosure. The heating of the FAE material begins and local temperature measurement of the water above the level of FAE material, as well as of the FAE material itself as fuel loading proceeds, may be accomplished by temperature monitoring systems that are part of the METAL system enclosure 31.

Once the FAE material is thoroughly liquefied, spent fuel can begin to be loaded into the basket structure, passing slowly through the liquefied FAE. However, it is important to know that, because of the density, viscosity, and depth of particular FAE materials, some additional, modest vertical force could be required to correctly position and timely seat some fuel assemblies in the basket structure. This will require a facility-design-specific (nuclear or other facility type of plant design) force-application handling device (FAHD) 37, with all appropriate controls and safety systems to assure misapplication of force is rendered virtually impossible. The FAHD is stored in tool storage 34. One preferred approach is to use a fuel handling fixture that is a weighted, rigid metal structure with a remotely operated attachment design at one end that mates closely with the spent fuel assembly's upper end fitting and the attachment design at the other end that mates closely with the fuel handling system's hook or adapter, whose weight and in-line vertical force design may be necessary to provide some additional force on the fuel assembly, within the fuel design limits. The higher viscosity of the liquid FAE material compared to that of water makes this a valuable feature to accurately position spent fuel in the basket and reduce loading time.

(2) Hazardous Waste Loading Operations when FAE Material is Loaded After Wet Loading of Hazardous Waste Material In this embodiment of the present invention, the hazardous waste material is loaded as is typical for particular ASTRID system designs that are currently licensed and in use today. Following that loading, the FAE material would be loaded, in one of the fashions as previously discussed above.

4. General Operations Discussion

This discussion offers a further, integrated and more detailed explanation, including cautions and considerations, of embodiments presented herein for how the process to load spent fuel or other radioactive, fissionable, or hazardous material into the ASTRID system storage, transport, or disposal canister or cask would be accomplished. Generally, such loading would follow a similar process as is presented in the following discussion. However, certain scenarios may require some variations from this discussion, owing to the unique features of a particular ASTRID system or plant design. Those skilled in the art of such systems will be able to identify unique features requiring special operational considerations. Further, because spent nuclear fuel casks or canisters likely represent the most challenging loading scenario, such casks or canisters are used in the following example. Other waste forms or radioactive, fissionable, or hazardous materials should present a more simplified loading task operationally.

A spent fuel canister with its basket within a cask cavity or a cask with the spent fuel basket within its cavity, together with solid FAE material of the precise amount previously installed, would be brought to the cask loading area of the reactor or other nuclear facility spent fuel pool and, using the cask handling crane, placed in the METAL system's loading structure in the pool, that structure having heaters to heat the FAE material directly or to heat available water from local tankage on the operations floor. The heat from the heaters and/or from the water would be used to liquefy the FAE material. Further, depending on the selected FAE material, the melting, liquidus and solidus points may be below the boiling point of water so that steam would not be required, but could still be used.

Once the FAE material is thoroughly liquefied, by measurement, spent fuel can begin to be loaded into the basket structure, passing slowly through the liquefied FAE material, though some additional, modest vertical force could be required to correctly position and seat some fuel assemblies in the basket structure. This may require the use of the FAHD, discussed previously.

Whether backfilling with FAE material before or after fuel loading, the fill rate is always determined to assure that the level in the cask or canister basket tubes increases slowly enough so that voids, bubbles, or water in the FAE are minimized, though such events are not a significant design limitation. It may also be advisable to have the cask or canister basket tubes heated by external heaters to keep the FAE material liquid until the cask or canister is filled with its design content. If the FAE material is added after fuel is loaded, then filling is stopped when the FAE material is at its proper fill level. After FAE material backfilling is complete, the fill lines are removed, and the loading is completed as discussed above for the preferred loading approach involving addition of the FAE material at a fabrication or other facility prior to delivery to the source of the spent fuel or other hazardous material contents.

When the cask or canister is completely filled with its hazardous waste materials, the cask or cask with canister is removed from the METAL system enclosure by its lift yoke using the spent fuel cask handling or other crane system. When the cask or cask with canister extends just above the pool surface, the top surface of the solid or liquid FAE material will have any water retained thereon removed by a portable pumping system and discharged back into the pool.

After checks are made to verify that there are no gaps or extreme voids in the FAE material (typically, this would be done by checking cask surface radiation dose rates, or by sensors installed during cask fabrication that can detect both radiation and temperature and, using programmed algorithms, show that the alloy backfill meets licensing requirements), the required closures/lidsare installed, as previously discussed for both canister (if used) and cask, the last lid being the cask closure lid. Once each closure lid is installed, the system similar to that in U.S. Pat. No. 9,117,558 would be used to dry the canister (if used), then the cask, where the minimal open space within the cask interior is dried to assure moisture levels are within the licensing requirements. For the canister (if used) or cask, the minimal open space within the canister (if used), then the cask would be backfilled with a very small volume of inert gas. Following the performance of all final licensing checks, the cask system is then ready to be placed into storage or to be prepared for transport to another location.

This entire process should require less time than that required for the current vacuum drying process and inert gas backfill, would require less radiation exposure to operators than current practices, and would save the cost of the very large quantities of inert backfill gas that are presently necessary. Additionally, this process can be adapted very well for a full range of numerous FAE materials. This method applies to all of these materials because the process is easily adaptable, once the concept is fully understood by those skilled in the art.

As a final consideration, should any facility within the ASTRID waste-handling life-cycle receive a cask or cask with canister using this advanced metallic encasement and encapsulation technology and need to remove the FAE material, a system of heating the cask or canister (even with a hot water tank system for some FAE materials or electric heaters) will liquefy the FAE material, and fittings on the bottom of the cask or cask with canister can be used to drain the FAE material, allowing direct access to the cask or canister contents for further disposition.

As is clear, this process is unique, completely different from anything that has ever been developed or deployed before for U.S. or other reactors of western design, and non-obvious, owing to the use of molten metal under water or with the cask immersed in pool water at a nuclear or other facility storage pool. This novel ASTRID package technology enhances performance and safety and security, representing a significant step forward in managing nuclear and hazardous waste systems' life cycle around the world.

C. CONCLUSIONS

A method using FAE materials to encase hazardous waste materials, such as spent nuclear fuel, other radioactive, and/or fissionable materials, then encapsulate such materials in the containment system similar to current at-site storage, transport, repository interim-storage, and disposal system designs, can substantially improve upon ASTRID package technology for enhanced system performance, greater safety margins, greater security, and an improved waste handling system life-cycle cost. For the nuclear energy fuel cycle, this method, applied to greatly enhance current system designs, truly represents a new generation of nuclear waste storage, transport, and disposal technology that significantly improves the backend of the nuclear energy fuel cycle by improving performance in each critical area of cask design, as follows.

Thermal: a metal conduction system design that removes heat by direct contact with spent fuel and transfers this heat to the cask periphery through a highly conductive FAE material media. Lower fuel temperature and, thus, higher margins to safe temperature limits are achieved.

Criticality: a moderator exclusion design that eliminates the possibility of neutron thermalization and, thus, criticality. Furthermore, some FAE materials may contain neutron absorbers such as cadmium, potentially improving criticality control in the system. The system would, thus, be unique for the storage, transport, or disposal of intact materials (i.e., non-consolidated materials, where water is not excluded by the proximity of the intact materials) that are fissionable by thermalized neutrons, in that no thermalized neutron absorber materials would be required in the system's basket design.

Shielding: because the FAE materials will fill many void spaces within the basket and within the fuel assemblies or other radioactive or fissionable material, the present invention minimizes radiation streaming and enhances shielding such that the radial requirements for shielding in the cask body system are decreased. This will enable some reduction in the thickness of the cask wall shielding materials and, therefore, in the diameter of the cask system, as well as in its cost of materials and fabrication, while improving dose performance.

Loading operations: an improved method to remove moisture through passive buoyancy minimizes vacuum drying times and cask/canister processing times.

Simplified basket design: the basket structure will not require fixed thermal neutron absorbers and will require less structural material and reduced assembly labor, making the basket design, material, and fabrication costs lower than conventional designs.

Geometry control: with the encasement and encapsulation of the hazardous waste material contents in metal, the system offers what no other design can offer: a system to mechanically and uniformly immobilize contents, which supports reduced analysis uncertainty, less variable shielding situations and package exterior dose rates, and avoidance of damage to the interior of the packaging due to shifting of very heavy contents.

Finally, the benefits in each key design feature are applicable to every phase of the ASTRID cycle, potentially offering a storage, transport, and disposal system solution that can be truly integrated with all the backend requirements and offers a standardized technology approach to address spent fuel and other radioactive, fissionable, or hazardous material management requirements from storage through disposal.

While in the foregoing specification this invention has been described in relation to certain embodiments thereof, and many details have been put forth for the purpose of illustration, it will be apparent to those skilled in the art that the invention can present additional embodiments and that certain of the details described herein can be varied considerably without departing from the basic principles of the invention.

The invention claimed is:

1. An apparatus for storing, transporting, and disposing of hazardous material, comprising:

a cask system;

a containment system that is a separate subsystem within the cask system, the containment system comprising at least one elongated vertically oriented receptacle, the at least one elongated vertically oriented receptacle extending upwardly from a bottom plate of the containment system;

a hazardous material disposed in the at least one elongated vertically oriented receptacle;

a secondary material comprising at least a fusible alloy or an eutectic material, the secondary material being disposed in the at least one elongated vertically oriented receptacle and being in direct contact with external surfaces of the hazardous material that are accessible by the secondary material;

a free-surface-effect suppression lid mounted near a top of the containment system to prevent the secondary material from adhering to a cask containment lid as the secondary material solidifies, the free-surface effect suppression lid being configured to limit free-surface motion of the secondary material while the secondary material is in a liquid phase; and the cask containment lid sealed over the top of the cask system, the cask containment lid being positioned over the free-surface-effect suppression lid to seal the containment system; and an inert gas back-filled within cask internals of the cask system, wherein the hazardous material is introduced into the at least one elongated vertically oriented receptacle following the cask system being placed into a spent fuel pool of water, and wherein the secondary material is preinstalled into the at least one elongated vertically oriented receptacle in a liquid form, the secondary material being configured to solidify as a temperature of the hazardous material decreases.

2. The apparatus of claim 1, wherein the containment system comprises at least one of: (1) a basket structure, (2) a removable canister with or without the basket structure, (3) a fixed shell of a cask body of the cask system with or without the basket structure, or (4) one or more independent canisters to receive the hazardous material.

3. The apparatus of claim 2, wherein:

the at least one elongated vertically oriented receptacle comprises a plurality of elongated vertically oriented receptacles;

the containment system comprises the basket structure;

the basket structure includes at least the plurality of elongated vertically oriented receptacles;

each elongated vertically oriented receptacle is defined by respective uninterrupted walls to receive the hazardous material and retain and control the secondary material, the plurality of elongated vertically oriented receptacles are arranged in a configuration such that adjacent receptacles are in continuous contact with one another and an outside row of receptacles is in contact with a containment vessel wall of the containment system for necessary and sufficient conduction of any hazardous material's exothermic heat to a shell of the containment system;

a respective top opening of each of the elongated vertically oriented receptacles is sized and shaped to ease the insertion of the hazardous material and to accept fixturing that facilitates back-fill loading of the secondary material, and is configured to limit release of the hazardous material to meet regulatory requirements; and one or more of the plurality of elongated vertically oriented receptacles are partially filled or unfilled with the secondary material, permitting a higher total hazardous material weight capacity and licensed content within the containment vessel, and placing the hazardous materials having appropriate heat generation rates and levels of fissionable hazardous materials in the one or more of the plurality of elongated vertically oriented receptacles with less secondary material, the cask content capacity being increased without exceeding design and regulatory requirements.

4. The apparatus of claim 1, wherein the containment system is removable.

5. The apparatus of claim 1, wherein the free-surface-effect suppression lid comprises a vent system to support vacuum drying.

6. The apparatus of claim 1, wherein the containment system comprises one or more vapor condensation drain structures interposed between the containment system and an inner wall of the cask system.

7. The apparatus of claim 6, wherein the one or more vapor condensation drain structures are coupled to a bottom portion of the cask system.

8. The apparatus of claim 1, wherein the cask system comprises a bottom space plate elevated off of a cask bottom plate of the cask system, the containment system being attached to the bottom space plate, the bottom space plate being configured to allow vapor condensate and excess water to drain into a cavity between the bottom space plate and the cask bottom plate.

9. The apparatus of claim 8, wherein the cask system comprises a cask bottom drain valve, the cask bottom drain valve being configured to drain water from the cavity.

10. The apparatus of claim 1, wherein the secondary material is liquefied in proximity to the spent fuel pool using heated water or electrical heaters in a tankage facility.

11. An apparatus for storing, transporting, and disposing of hazardous material, comprising:

a cask system;

a containment system that is a separate subsystem within the cask system, the containment system comprising an elongated vertically oriented receptacle, extending upwardly from a bottom of the containment system;

a hazardous material disposed in the elongated vertically oriented receptacle, the hazardous material comprising at least one or more of spent nuclear fuel, radioactive material, or fissionable material;

a secondary material comprising at least a fusible alloy or an eutectic material, the secondary material being disposed in the elongated vertically oriented receptacle and being in direct contact with external surfaces of the hazardous material that are accessible by the secondary material;

a free-surface-effect suppression lid (free-surface lid) mounted near atop of the containment system to prevent the secondary material from adhering to a cask containment lid as the secondary material solidifies, and to provide a vent system to support vacuum drying, the free-surface lid being configured to limit free-surface motion of the secondary material while the secondary material is in a liquid phase;

the cask containment lid sealed over the top of the cask system, the cask containment lid being positioned over the free-surface lid to seal the containment system; and inert gas disposed within cask internals of the cask system, wherein the secondary material is preinstalled into the elongated vertically oriented receptacle in a solid form prior to introducing the hazardous material to the elongated vertically oriented receptacle, wherein the secondary material is liquefied in proximity to a spent fuel pool of water prior to introducing the hazardous material, and wherein the hazardous material is introduced into the elongated vertically oriented receptacle when the cask system is placed in the spent fuel pool of water, the secondary material being in a liquid form when the hazardous material is introduced.

12. The apparatus of claim 11, wherein the containment system comprises a removable canister, the removable canister containing the hazardous material; and wherein the secondary material is situated in a first area within the removable canister, in a second area that is within the cask system and outside the removable canister, or within the first area and the second area.

13. The apparatus of claim 11, wherein:

the vertically oriented elongated receptacle is one of a plurality of vertically oriented elongated receptacles of a basket, the cask system comprises a cask body having a vertically oriented elongated body between a bottom part and the top of the cask system; and the containment system comprises:

a canister system comprising a removable canister, the canister system being separately insertable and removable from the cask system, the canister system being enclosed within the vertically oriented elongated body of the cask system, the canister system further comprising the basket; and the basket having the plurality of vertically oriented elongated receptacles within a body of the removable canister and extending along the body of the removable canister with at least one of the plurality of vertically oriented elongated receptacles having the hazardous material surrounded by the secondary material that is in direct contact with external surfaces of the hazardous material that are accessible by the secondary material, wherein each elongated vertically oriented receptacle is defined by respective uninterrupted walls to receive the hazardous material and retain and control the secondary material, the plurality of elongated vertically oriented receptacles are arranged in a configuration such that adjacent receptacles are in continuous contact with one another and an outside row of receptacles is in contact with a containment vessel wall of the containment system for necessary and sufficient conduction of any hazardous material's exothermic heat to a shell of the containment system, a respective top opening of each of the elongated vertically oriented receptacles is sized and shaped to ease the insertion of the hazardous material and to accept fixturing that facilitates back-fill loading of the secondary material, and is configured to limit release of the hazardous material to meet regulatory requirements, and one or more of the plurality of elongated vertically oriented receptacles are partially filled with the secondary material, permitting a higher total hazardous material weight capacity and licensed content within the containment vessel, and placing the hazardous materials having appropriate heat generation rates and levels of fissionable hazardous materials in the one or more of the plurality of elongated vertically oriented receptacles with less secondary material, the cask content capacity being increased without exceeding design and regulatory requirements.

14. The apparatus of claim 13, wherein the cask system comprises: a second vertically oriented elongated receptacle separate from the plurality of vertically oriented elongated receptacles of the body of the removable canister, the second vertically oriented elongated receptacle having the hazardous material surrounded by the second vertically oriented elongated material, the second vertically oriented elongated receptacle having lifting and handling apparatuses for receptacle loading and installation into the basket.

15. An apparatus for storing, transporting, and disposing of hazardous material, comprising:

a cask system comprising a cask body and a cask bottom plate disposed along a bottom portion of the cask body, the cask system having an interior defined by one or more cask body walls, the cask system further comprising a cask bottom drain valve configured to drain water from the interior;

a containment vessel disposed within the cask system and coupled to the bottom portion of the cask body, the containment vessel comprising one or more vapor condensation drain structures interposed between the containment vessel and an inner wall of the one or more cask body walls, the one or more vapor condensation drain structures being coupled to the bottom portion of the cask system;

a basket comprising a plurality of elongated vertically orientated receptacles disposed within the containment vessel, the plurality of elongated vertically oriented receptacles extending upwardly from a bottom plate of the containment vessel to limit release of hazardous material to meet regulatory requirements, and comprising uninterrupted walls to receive hazardous material and retain and control secondary material comprising at least a fusible alloy or an eutectic material;

a free-surface lid comprising a vent system to support vacuum drying, the free-surface lid being configured to be placed on a top of the containment vessel to seal the containment vessel, the free-surface lid further being configured to limit free-surface motion of the secondary material in a liquid form, the secondary material being disposed within the containment vessel and in direct contact with the hazardous material, the secondary material comprising a fusible alloy or an eutectic material; and an external lid configured to seal the cask system in a position over the free-surface lid.

16. The apparatus of claim 15, further comprising the secondary material and the hazardous material, the secondary material having a temperature to permit (1) dry loading into and around the hazardous material, or (2) loading of the secondary material in a liquid state underwater of a spent fuel pool of a thermal, water-cooled reactor (TWR) that precludes boiling of pool water of the spent fuel pool around the hazardous material to such an extent that the pool water temperature of the spent fuel pool of water remains in compliance with the design and regulatory requirements.

17. The apparatus of claim 16, wherein the plurality of elongated vertically oriented receptacles are arranged in a configuration such that adjacent receptacles are in continuous contact with one another and an outside row of receptacles is in contact with a containment vessel wall of the containment vessel for necessary and sufficient conduction of any hazardous material exothermic heat to a shell of the containment vessel, a respective top opening of each of the elongated vertically oriented receptacles is sized and shaped to ease the insertion of the hazardous material and to accept fixturing that facilitates back-fill loading of the secondary material, and is configured to limit release of the hazardous material to meet regulatory requirements, and one or more of the plurality of elongated vertically oriented receptacles are partially filled or unfilled with the secondary material, permitting a higher total hazardous material weight capacity and licensed content within the containment vessel, and placing the hazardous materials having appropriate heat generation rates and levels of fissionable hazardous materials in the one or more of the plurality of elongated vertically oriented receptacles with less secondary material, the cask content capacity being increased without exceeding design and regulatory requirements.

18. The apparatus of claim 16, wherein:

the cask system comprises a cask body having a vertically oriented elongated body between a bottom part and the top of the cask system; and the containment vessel comprises:

a canister system comprising a removable canister, the canister system being separately insertable and removable from the cask system, the canister system being enclosed within the vertically oriented elongated body of the cask system, the canister system further comprising a basket structure comprising a basket having the one or more vertically oriented elongated receptacles within a body of the removable canister and extending along the body of the removable canister with at least one of the one or more vertically oriented elongated receptacles having the hazardous material surrounded by the secondary material that is in direct contact with external surfaces of the hazardous material that are accessible by the secondary material.

19. The apparatus of claim 16, wherein the cask system comprises a bottom space plate elevated off of a cask bottom plate of the cask system, the containment vessel being attached to the bottom space plate, the bottom space plate being configured to allow vapor condensate and excess water to drain into a cavity between the bottom space plate and the cask bottom plate.

20. The apparatus of claim 16, wherein the apparatus is designed to facilitate unloading of the hazardous material with features to re-liquefy and drain the secondary material to provide access for unloading the hazardous material, thereby allowing the apparatus to be loaded and unloaded in at least one of: (1) underwater in the spent fuel pool of the TWR, (2) a regulation compliant environment at a source site, or (3) the regulation compliant environment at a remote site.

* * * * *